June 25, 1935.  A. J. SCHOLTES  2,006,328
CENTER BOWING STEERING AND BRAKING SLED RUNNERS
Filed July 25, 1934   4 Sheets—Sheet 1
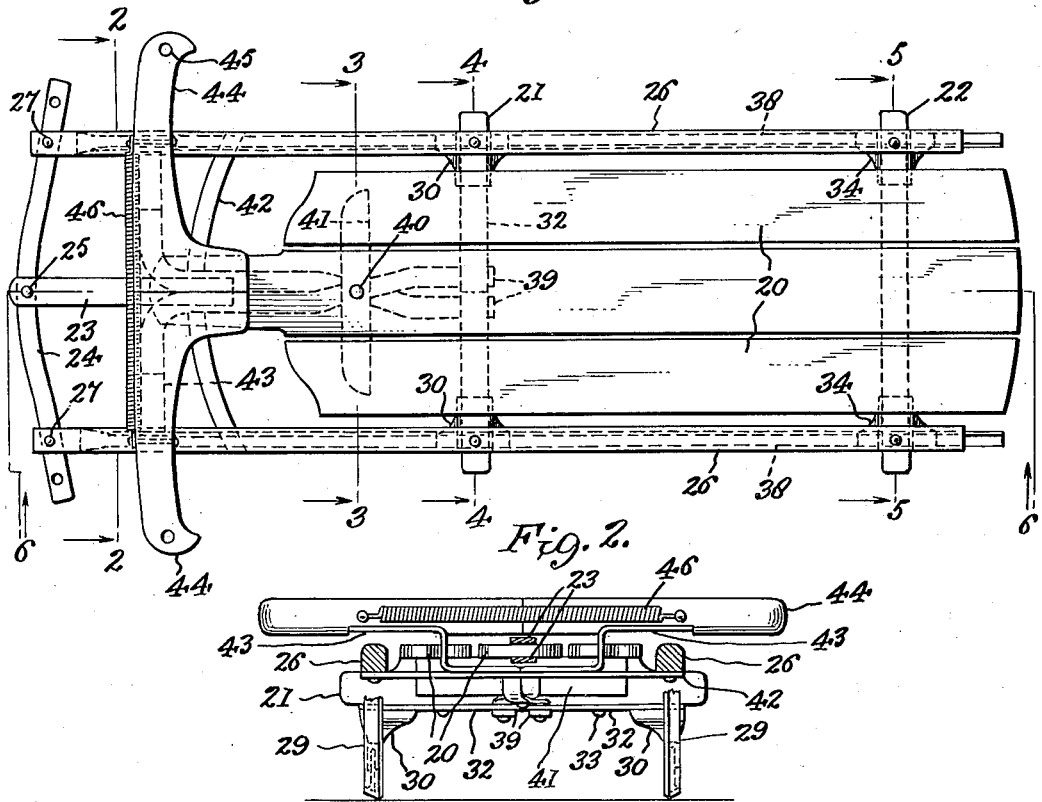
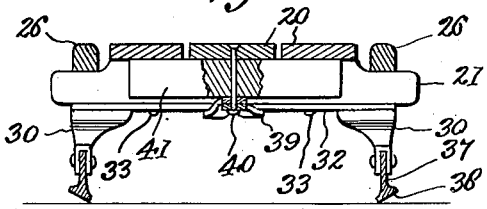
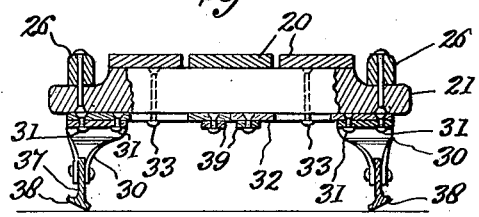
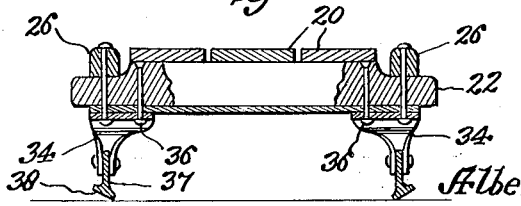
Inventor
Albert J. Scholtes
By Mawhinney & Mawhinney
Attorneys.

June 25, 1935.  A. J. SCHOLTES  2,006,328
CENTER BOWING STEERING AND BRAKING SLED RUNNERS
Filed July 25, 1934   4 Sheets-Sheet 2
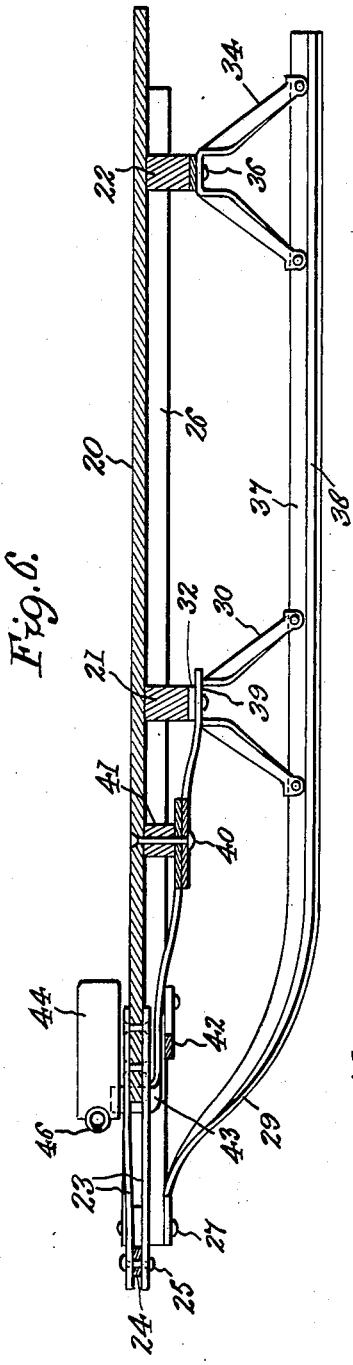
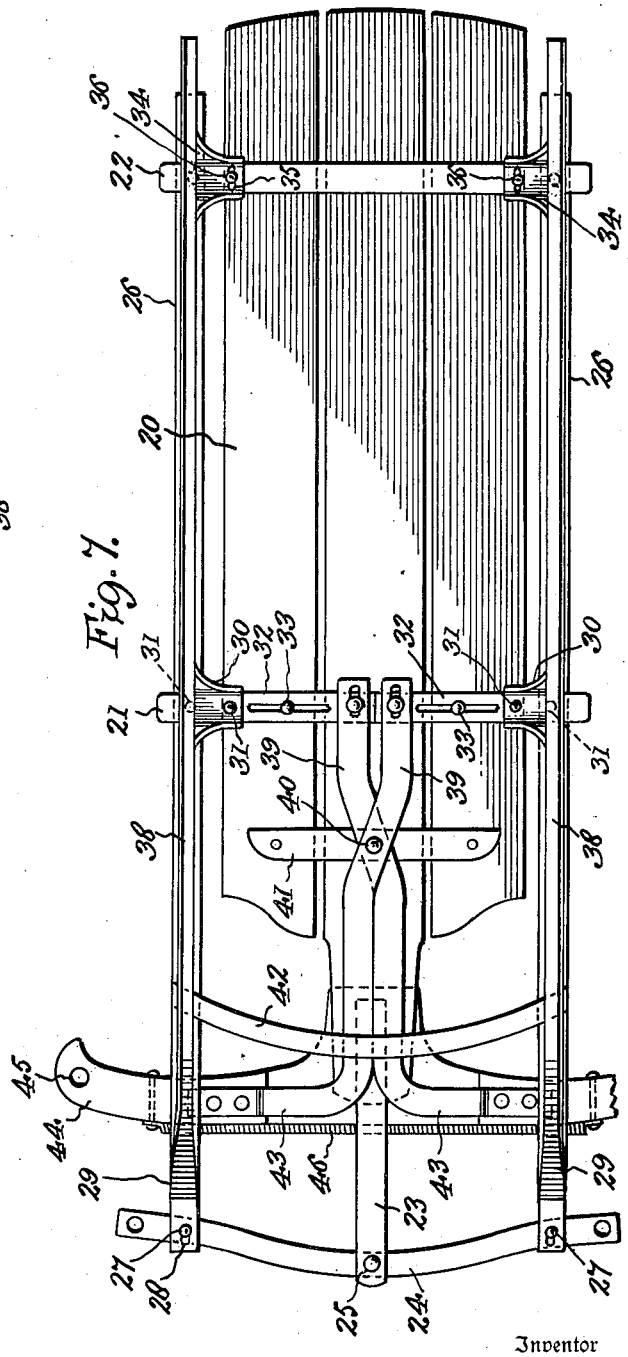
Inventor
Albert J. Scholtes
By Mawhinney & Mawhinney
Attorneys.

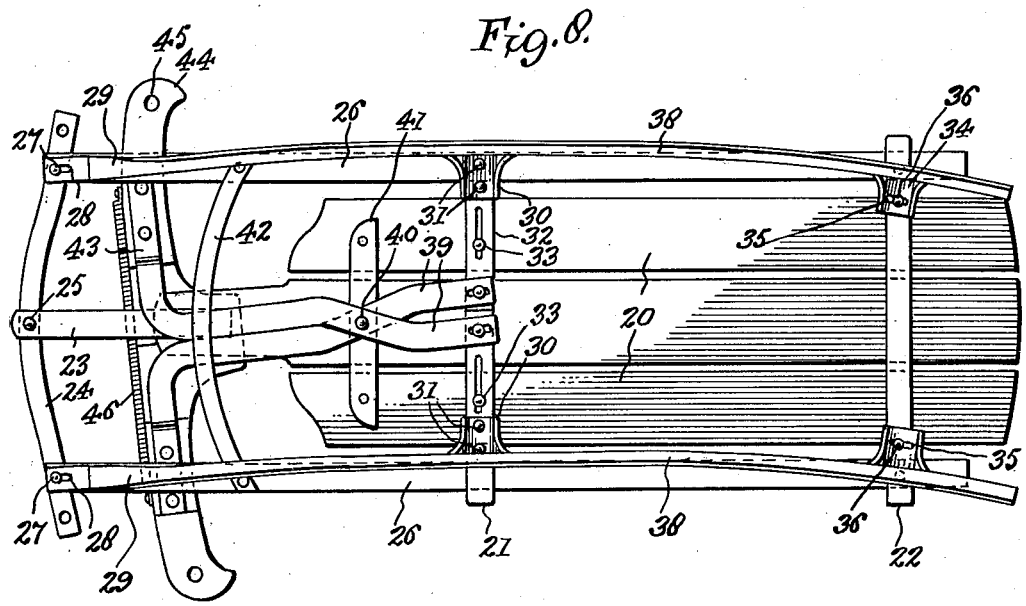
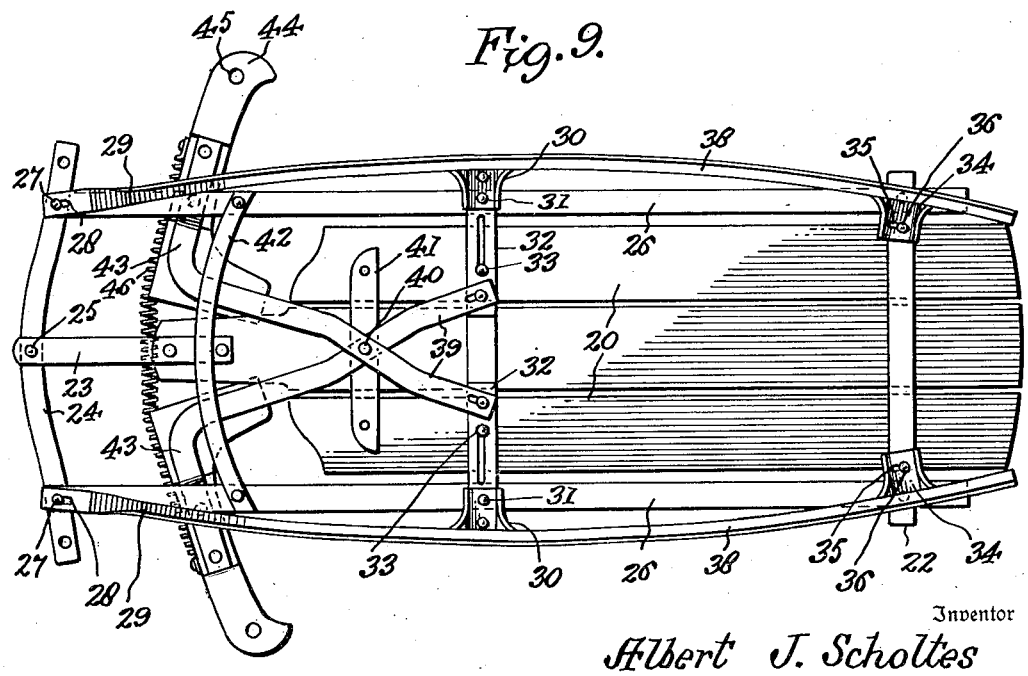

June 25, 1935.  A. J. SCHOLTES  2,006,328
CENTER BOWING STEERING AND BRAKING SLED RUNNERS
Filed July 25, 1934  4 Sheets-Sheet 4
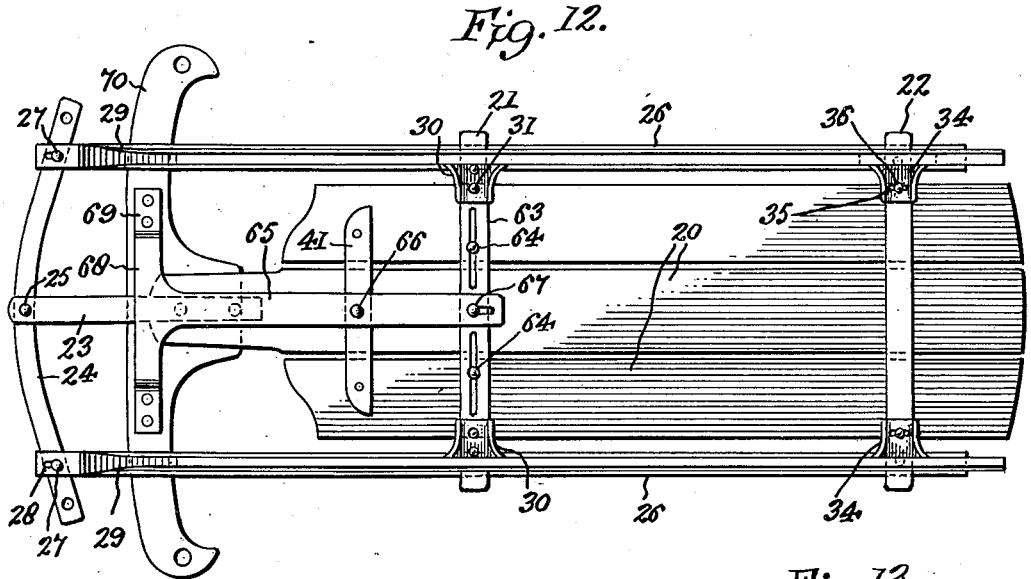
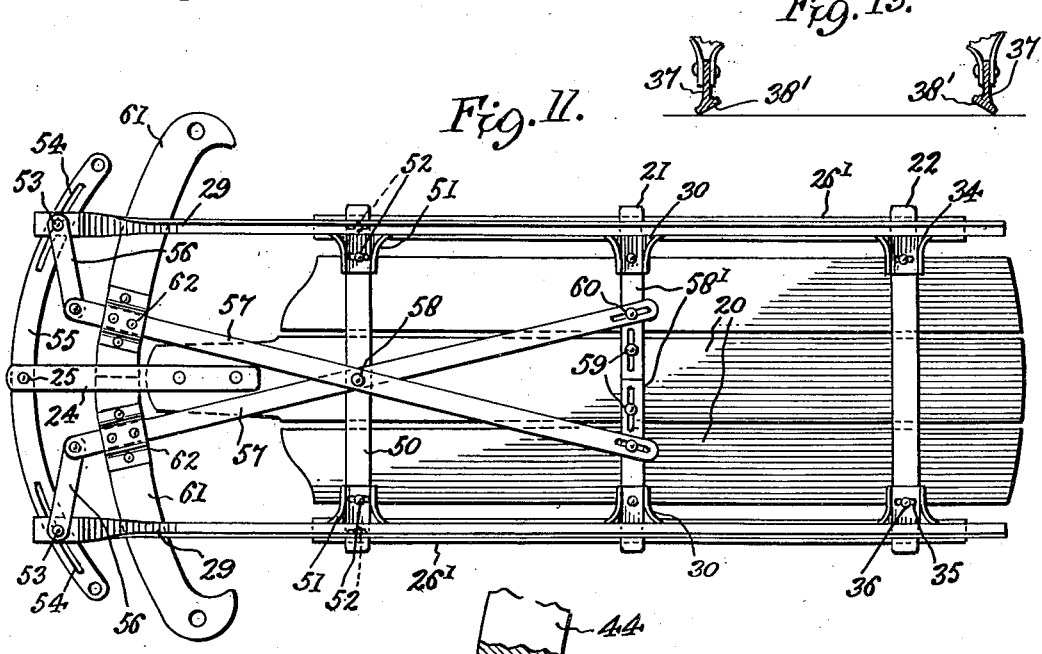
Inventor
Albert J. Scholtes
By Mawhinney & Mawhinney
Attorneys.

Patented June 25, 1935

2,006,328

UNITED STATES PATENT OFFICE 2,006,328

CENTER BOWING STEERING AND BRAKING SLED RUNNERS

Albert J. Scholtes, Baltimore, Md.

Application July 25, 1934, Serial No. 736,932

14 Claims. (Cl. 280—22)

The present invention relates to sleds and the like devices having runners whether of the coasting type or of the horse drawn or similar type, and more particularly to a novel steering or guiding and braking means for the sleds.

The steering of sleds by flexible runners has heretofore been accomplished by flexing the forward portion only of the runners and leaving the major portion of the runners in a straight line. This sets up a side friction or side sway between the ice and the sled as the runners do not "track" in turning; consequently the speed of the sled is retarded and there lacks the desired degree of control of the sled in taking turns or curves.

Furthermore the retarding or braking of the speed of sleds heretofore has required the use of attachments or brakes as separate adjuncts to the runners or bodies of the sleds, and the present invention eliminates all attachments or separate parts and provides a braking action which is even and without side sway merely by flexing certain portions of the runners out of line to prevent tracking of the consecutive portions of the runners and set up side thrust thereagainst.

Another object of the invention is to provide an improved construction of runner which not only presents an easily sharpened cutting edge but which, when used in pairs beneath the sled body, engages firmly in the ice and resolves the pressure forces of the weight of the sled on the opposed runners into centrally directed and counterbalancing pressures tending to stabilize the sled and hold it in its true course in a direct line of travel, on a curve, and when the braking action is used. Furthermore these centrally and downwardly directed pressure forces serve to reduce side sway of the sled at all times, and particularly when subjected to the braking action.

Another feature of the invention is to provide a sled with a transverse steering bar which may be disposed in the commonly accepted position across the forward portion of the sled for bowing the runners laterally at intermediate points to guide the sled, and which may also be actuated in a manner to oppositely flex the runners and effect a balanced and opposed side thrust on the runners for retarding the speed of travel of the sled whether traveling in a straight or a curved path.

A further object of the invention is to provide a two part handle bar for the sled which has the parts so connected to the runners that when the parts are shifted together as a unit to the right or left the runners will be flexed accordingly to change the direction of travel of the sled into the respective direction, and that when the handle bar parts are moved separately the runners will be flexed independently and in opposite directions to throw the runners out of line and in opposed position to effect the braking of the sled.

The features of this invention are applicable to sleds having any desired number of pairs of brackets but the following specifications are directed more particularly to sleds to the two-bracket type.

With the foregoing and other objects in view, the invention will be more fully described hereinafter, and will be more particularly pointed out in the claims appended hereto.

In the drawings, wherein like symbols refer to like or corresponding parts throughout the several views:—

Figure 1 is a top plan view of a sled embodying the novel features of the present invention.

Figure 2 is a transverse section taken on the line 2—2 of Figure 1, looking toward the two-part handle bar.

Figure 3 is a like view taken on the line 3—3 of Figure 1, showing the pivotal support for the arms connecting the runners to the handle bar.

Figure 4 is another transverse section taken on the line 4—4 of Figure 1, showing the side bracket structure for the intermediate portions of the runners.

Figure 5 is a similar section taken on the line 5—5 of Figure 1, showing the rear bracket mounting for the runners.

Figure 6 is an enlarged longitudinal section taken centrally on the line 6—6 of Figure 1.

Figure 7 is a bottom plan view of the same.

Figure 8 is a like view on a reduced scale but showing the new runner flexing means adjusted to guide the sled on a curve in one direction.

Figure 9 is another bottom plan view showing the new runner flexing means adjusted to apply a braking action to the sled.

Figure 10 is a detail fragmentary sectional view of the handle bar sections, showing a modified means for yieldably holding the sections together for movement as a unit to guide the sled.

Figure 11 is a bottom plan view of a modified form of the runner flexing means as applied to a three-bracket sled.

Figure 12 is a like view showing another modified form applied to a two-bracket sled and wherein the braking feature is omitted, and Figure 13 is a fragmentary sectional view of the runners showing the ice contact shoes disposed at an angle opposite to that shown in Figures 2 to 5.

Referring now to the drawings, and first to the form of the invention disclosed in Figures 1 to 9, the features of the invention are applied for the purpose of illustration to a sled of the coaster type, and it is to be understood that the body structure of the sled is immaterial if not in conflict with the support and operation of the runners.

The sled body comprises a platform 20 having the usual transverse bolsters 21 and 22 disposed respectively intermediate the platform and at the rear end thereof and which are adapted to secure and hold together the boards of the platform. The center board of the platform 20 projects forwardly and is provided with a pair of straps 23 of strap iron or the like which are secured by rivets against the upper and lower sides of the board extension and which support between their outer ends a bumper bar 24 which may be curved or given other suitable configuration, as shown in Figures 1 and 7 particularly. A rivet 25 extends through the bumper bar 24 and straps 23.

The platform 20 is provided along its opposite sides with spaced rails 26 which may be secured to and supported upon the lateral extensions of the bolsters 21 and 22, the rails 26 extending forwardly and secured to the outer end portions of the bumper bar 24 by rivets 27.

The rivets 27 extend downwardly and pass through longitudinal slots 28 formed in the forward end portions of runners 29, the rivets 27 being headed or otherwise upset at their lower ends for supporting the runners 29 for sliding and pivotal movement. The rivets 27 thus anchor the forward ends of the runners 29.

The runners 29 are bent downwardly beneath the platform for contact with the ground and extend rearwardly beneath the bolsters 21 and 22. The intermediate bolster 21 carries a pair of transversely slidable brackets 30 which are provided with diverging arms at their lower ends and which are secured by rivets 31 or the like to a pair of slide bars 32 which are longitudinally slotted and which are slidably held against the lower side of the bolster 21 by headed guide pins 33 or the like. The inner ends of the slide bars 32 normally abut, as shown in Figure 7, and when in this position the brackets 30 are held in line with the runners 29 so that the latter normally lie straight so as to properly track when the sled is moving in a straight line direction. The slide bars 32 with their brackets 30 are adapted to be spread apart for flexing or bowing either together or separately the opposite intermediate portions of the runners 29 to control the movements of the sled.

The rear bolster 22 carries a pair of pivotally mounted brackets 34 which may be of any suitable type and are shown as having longitudinal slots 35 receiving headed guide pins 36 which hold the brackets 34 to the lower surface of the bolster 22. The brackets 34 are branched and secured to the rear end portions of the runners 29.

As may be best seen from Figures 2 to 5, inclusive, the runners are provided with attaching flanges 37 extending lengthwise of the runners and which are seated in the lower ends of the brackets 30 and 34 in the usual manner. The flanges 37 carry flat shoe portions 38 which provide the ground contact surfaces or portions of the runners. These flat shoes 38 are disposed at inwardly and downwardly converging angles across the lower edges of the flanges 37 so as to present sharp ice engaging edges at the inner opposite portions of the runners. The flat shoes also provide outwardly and upwardly flaring sustaining surfaces adapted to engage the snow and ice and support the load imposed on the runners and at the same time direct the pressure forces inwardly and centrally to stabilize the sled and offset side sway.

As the runners 29 are anchored at opposite ends to the forward and rear portions of the sled body in a manner admitting of the pivoting and longitudinal sliding movement of the ends of the runners, the central or intermediate parts of the runners may be flexed laterally either toward each other or outwardly from each other so as to dispose certain portions of the runners out of line to brake the movement of the sled or to bow the runners outwardly into substantially concentric curves for changing the direction of travel of the sled in either direction.

Any suitable means may be resorted to for carrying out these purposes but in the present instance the slide bars 32 with their brackets 30 are employed, and the slide bars are pivotally connected to the rear ends of a pair of crossed arms 39 which at their crossed portions are not only interconnected but are secured to the body of the sled by a pivot 40. The pivot 40 may be carried upon a cleat 41 or the like secured across the boards of the platform 20 and at a point forwardly of the intermediate bolster 21. The crossed arms 39 extend forwardly from the cleat 41 and are preferably disposed in parallel edgewise contact so as to hold the arm structure closed and maintain the slide bars 32 in abutting relation.

An arcuate support 42 is secured across the lower sides of the arms 39 adjacent their outer ends, the ends of the support 42 being riveted or otherwise suitably secured to the side rails 26.

The forward ends of the arms 39 are turned outwardly from each other at substantially right angles to provide attaching straps 43 which are disposed substantially in transverse alinement with reference to the sled body. These attaching straps are riveted or otherwise suitably secured against and in countersunk relation with the lower sides of a pair of control members or hand grips 44 projecting outwardly beyond the side rails 26 and suitably shaped for receiving the hands thereabout or the feet thereagainst.

These control elements may have openings 45 in their outer ends for the reception of draft ropes or the like for drawing the sled and guiding the same by operating the elements 44. The elements 44 have their inner ends normally abutting and are yieldingly or releasably held in such position by any suitable means, such as by a coil spring 46 which may be seated in the grooved forward edges of the elements 44 and anchored at opposite ends to the elements for drawing the same together. The elements 44 are preferably disposed above the rails 26 and the attaching straps 43 are suitably offset upwardly at opposite sides of the center straps 23 and in spaced relation thereto for supporting the elements and admitting of the free lateral swinging of the elements 44 with the arms 39.

In Figure 10 there is shown a slight modification wherein one of the elements 44 carries a ball head 47 while the other element 44 is provided with a recess 48 in its abutting end in which is seated a socket spring 49 adapted to engage the ball 47 and yieldingly hold the elements 44 together so that they may be operated as a unit or as a single guide bar for the sled.

With this construction it is apparent that when the arms 39 with the elements 44 are in normal straight line position, as shown in Figure 7, the sled will move forwardly or rearwardly in a straight line. When, however, the elements 44, being coupled or held together and moved as a unit laterally to either side of the sled body, such as shown in Figure 8, the arms 39 provide a single arm or lever which simultaneously and equally shifts the slide bars 32 and flexes laterally in one direction the intermediate portions of both of the runners 29. It will be noted that the runners are thus bowed into substantially concentric curves so that the sled may truly track in a curved path and so that there will be no side sway or drag at either or both sides of the sled to impede its progress or deflect the sled from the desired curved path.

When, however, it is desired to apply a braking action to the sled it is only necessary to draw backwardly and outwardly on the elements 44 so as to swing the same against the normal holding means, such as the spring 46, into the position shown in Figure 9. During this movement the crossed arms 39 are relatively swung on their supporting pivot 40 so as to spread apart the forward and rear ends of the arms 39. This action moves the slide bars 32 outwardly and laterally away from each other with the result that the brackets 30 are forced apart and the runners 29 are bowed or flexed outwardly and laterally in opposite directions so as to distort the runners to such an extent that they will not track and will offer considerable lateral resistance to the forward movement of the sled.

When the elements 44 are drawn backwardly and outwardly to an equal extent, the bowing or deformation of the runners is equal so that there will be an equal drag or resistance at opposite sides of the sled, and intermediate the ends of the sled to prevent side sway or swinging about of the sled tending to upset the same.

Of course the same result may be obtained by flexing the runners 29 out of line in either direction or at spaced points, depending upon the length and structure of the body portion of the sled. It is also apparent that various other means may be resorted to for normally holding the control elements 44 together as a unit.

In Figure 11, a slight modification is shown wherein the sled body is of the three bracket type so that the forward end portion of the sled body has a front bolster 50 which takes the place of the cleat 41 in the two bracket structure. The bolster 50 carries front brackets 51 which are secured by rivets 52 or the like.

The brackets 51 carry the forward intermediate portions of the runners 29, and the front ends of the runners are provided with rivets 53 slidably engaging in longitudinal slots 54 provided in the opposite end portion of the bumper 55. The rivets 53 of the runners are connected by links 56 to the forward ends of crossed arms 57 which are pivotally supported on a pivot 58 carried by the front bolster 50. The rear ends of the arms 57 are pivotally connected to the slide bars 58' which are longitudinally slotted and held for sliding movement against the under side of the intermediate bolster 21 by headed pins 59, the slide bars 58' carrying the brackets 30 which support the adjacent portions of the runners 29. The arms 57 are longitudinally slotted and are secured to the bars 58' by rivets 60 or the like.

The forward ends of the arms 57 carry laterally extending control elements 61 which may abut at their inner ends and be yieldably held together by the holding device of Figure 10, or which may be held together merely by the inherent resiliency of the runners 29. In all instances the resiliency of the runners may be utilized for holding the controlling members together for operation as a unit instead of the spring 46 or the ball and socket device of Figure 10. These control elements 61 are secured by straps 62 or the like to the arms 57 and these straps may be in bracket form so as to dispose the operating elements 61 in the desired position above the runners. It will be noted that the side rails 26' terminate at or adjacent to the forward pair of brackets 51 as the forward ends of the runners are adapted to flex oppositely and laterally with respect to the bowing or flexing of the intermediate portions of the runners.

In this modified form, when the operating members 61 are shifted laterally in one direction the links 56 slide the rivets 53 in the slots 54 of the bumper 55 and flex the forward ends of the runners in one direction. At the same time, the rear ends of the arms 57 shift the slide bars 58' in an opposite direction so as to bow or flex the intermediate portions of the runners and provide substantially the concentric and continuous curved runners beneath the sled. This may take place for changing the direction of travel of the sled in either direction, depending upon the direction of shifting of the control elements 61.

In a manner similar to that shown in Figure 9, when the control elements 61 are separated the arms 57 swing relatively about their pivot 58, shifting the slide bars 58' in opposite directions away from each other and bow the intermediate portions of the runners outwardly and laterally in opposite directions. At the same time, the forward ends of the arms 57 force the links 56 outwardly and flex the forward ends of the runners outwardly from each other so as to flare at the front of the sled. The result is that the runners 29 will be flexed or curved out of their normal straight line position and a braking or checking effect will be produced on the speed of travel of the sled.

In the modification shown in Figure 12, the structure is similar to that shown in Figures 1 to 9, with the exception that a single slide bar or connecting member 63 is provided on the under side of the intermediate bolster 21. The bolster 21 carries the brackets 30 and the bar 63 is slidably held by headed rivets 64 which pass through longitudinal slots formed in the bar 63. A single arm 65 is mounted on the pivot 66 carried by the cleat 41 and the rear end of the bar is connected to the transverse slide bar 63 by a pin and slot connection 67, as shown. The forward end of the arm 65 is provided with a T-head 68 having offset end portions forming attaching straps 69 secured against the under side of a control element or member 70 which may be in one piece or be otherwise constructed.

With this form of the invention no braking means is provided but when the control unit 70 is shifted to one side or the other, the arm 65 is swung on its pivot 66 so as to shift the bar 63 in an opposite direction and consequently bow or flex the intermediate portions of the runners 29 into substantially concentric curves.

Among various modifications which may be resorted to to meet the manufacture and use of the sled may be mentioned that the runners may be bowed, flexed or otherwise deformed inwardly toward each other so as to dispose the successive portions of the runners out of line, and other mechanism than as shown may be used for flexing the runners for guiding and braking purposes.

As an example of a modification of the structure of the runners, reference is made to Figure 13. Here the attaching flanges 37 have the flat shoe portions 38' inclined inwardly and upwardly to present sharp lower cutting edges and to provide oppositely acting supporting surfaces tending to stabilize the sled and offset side sway. The slide bars 32 not only have a transverse sliding action but also they may swing or pivot about their pins 33 with the flexing and longitudinal drawing of the runners 29.

What is claimed is:—

1. A sled having flexible runners, and a controlling device for the sled, said device comprising a pair of separable and yieldably connected parts independently connected to the runners, simultaneous movement of said parts as a unit adapted to flex said runners laterally in substantially concentric curves and independent movement of the parts adapted to flex the runners laterally and oppositely to retard the movement of the sled.

2. A sled having flexible runners, and a handle bar movably mounted across the forward end portion of the sled, and connected to the runners for curving the same laterally in the desired direction by laterally shifting the handle bar, said handle bar having relatively movable parts operable through the runner connection for flexing the runners laterally and independently of each other.

3. A sled having flexible runners, a pair of hand grips disposed in transverse alinement across the sled, and independent connections between the runners and the hand grip for simultaneously and independently flexing the runners by the simultaneous and independent movements of the hand grips.

4. A sled having flexible runners, a pair of pivotally connected and crossed arms mounted on the sled and connected at one end to the intermediate portions of the respective runners, and transversely alined hand grips connected to the other ends of the arms for swinging the hand grips and arms as a unit about the pivot of the arms to bow the runners laterally in one direction, said hand grips adapted to be independently moved for relatively turning the arms on their pivot and independently bowing the runners.

5. A sled having flexible runners, a pair of crossed arms pivotally mounted on the sled and connected at one end each to a runner, a pair of transversely alined operating elements connected to the other ends of the arms for swinging the arms and independently curving the runners, and releasable holding means for said elements to hold the same together for shifting as a unit to simultaneously and equally curve the runners in a lateral direction.

6. A sled having a pair of runners, said runners having attaching portions for securing the runners to the sled and having flat shoes disposed in inwardly and downwardly convergent relation beneath the sled to present sharp ice engaging edges and outwardly and upwardly flaring sustaining surfaces.

7. A sled having a pair of runners, each runner having a unitary flat ice and snow shoe, said shoes disposed in opposed transverse angular relation below the sled to present ice engaging edges and oppositely flaring snow engaging and sled sustaining surfaces to support the sled and offset side sway.

8. A sled comprising a body portion, a pair of flexible runners pivotally connected to the forward end of the body portion, a rear pair of brackets secured to the rear ends of the runners and pivotally mounted on the body portion, an intermediate pair of brackets secured to the adjacent portions of the runners and mounted for transverse sliding movements on the body portion, and a two-part crossed operating device pivotally mounted on the body portion with one end of the parts connected each to one of said intermediate brackets, the other ends of said parts adapted to be swung in one direction on their pivot and swung relatively on the pivot for flexing the runners in the same and in opposite directions laterally of the body portion.

9. A sled having a body portion, a pair of rear brackets pivotally mounted on the rear end of the body portion, a pair of intermediate brackets transversely slidable on the body portion, a pair of runners anchored at their forward ends on the front end of the body portion and secured to the respective brackets, and control means for the sled connected to the slidable brackets for simultaneously and independently moving the same to bow the runners laterally in one direction and in opposite directions.

10. A sled having a body portion, flexible runners anchored to the front end of the body portion, rear brackets pivotally mounted on the rear end of the body portion and secured to the runners for supporting the same, intermediate brackets engaging the runners to support the same, normally abutting slide bars mounted transversely on the body portion and each secured to an intermediate bracket, a pair of crossed arms pivoted to the body portion with one end of the arms each connected to a slide bar, means for yieldably holding the slide bars in abutting relation to flex the runners laterally in one direction when the arms are swung as a unit on their pivot, said arms adapted to be swung apart at their forward ends about their pivot to shift the slide bars apart and flex the runners laterally in opposite directions.

11. A sled having a pair of flexible runners anchored for longitudinal and lateral sliding movement at their forward ends, brackets pivoted on the sled for supporting the runners, transversely slidable brackets on the sled between the pivoted brackets for supporting the runners, a pair of crossed arms pivotally mounted on the sled between the forward ends of the runners and the slidable brackets and having pivotal connections at opposite ends therewith, and operating members carried in transversely alined position on the forward end portions of the crossed arms to swing the arms in one direction and in opposite directions for flexing the front and intermediate portions in the same and in opposite directions.

12. A sled comprising a body portion, a pair of flexible one piece runners mounted on the body portion, and means for flexing the runners laterally out of alinement in opposite directions for braking the movement of the sled.

13. A sled having flexible runners, and control means including a handle having two parts one of each being connected to a runner for independently flexing one or both of the runners to control movements of the sled.

14. A sled having flexible runners, and a pair of control members each connected independently to one of the runners for laterally bowing the runners in one direction to direct the sled in a curved path when said members are moved as a unit and for laterally bowing one or both runners to control the movements of the sled when said members are independently moved.

ALBERT J. SCHOLTES.